United States Patent
Lee et al.

(10) Patent No.: US 10,404,949 B2
(45) Date of Patent: Sep. 3, 2019

(54) SECURE AIRCRAFT CAMERA MONITORING SYSTEM

(71) Applicant: The Boeing Company, Chicago, IL (US)

(72) Inventors: Donald B. Lee, Mill Creek, WA (US); John M. Hood, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 120 days.

(21) Appl. No.: 15/207,296

(22) Filed: Jul. 11, 2016

(65) Prior Publication Data
US 2018/0013985 A1     Jan. 11, 2018

(51) Int. Cl.
*H04N 9/47*     (2006.01)
*H04N 7/18*     (2006.01)
(Continued)

(52) U.S. Cl.
CPC ......... *H04N 7/181* (2013.01); *H04N 1/00103* (2013.01); *H04N 1/2112* (2013.01); *H04N 1/4486* (2013.01); *H04N 5/2252* (2013.01); *H04N 5/23203* (2013.01); *H04N 5/23206* (2013.01); *H04N 2201/0039* (2013.01); *H04N 2201/0055* (2013.01); *H04N 2201/0084* (2013.01); *H04N 2201/3281* (2013.01)

(58) Field of Classification Search
CPC ...... H04N 7/181; H04N 7/188; H04N 5/2256; H04N 1/2112; H04N 1/4486
USPC ........................................................ 348/144
See application file for complete search history.

(56) References Cited

U.S. PATENT DOCUMENTS 6,864,805 B1 *   3/2005   Gomez .............. B64D 45/0015
                                                        340/945
7,131,136 B2 *   10/2006   Monroe ........... G08B 13/19641
                                                        340/945
(Continued)

OTHER PUBLICATIONS

Surveillance cameras 1/3" Sony CCD 700TVL Color Mini Security Camera Pinhole Camera with Microphone [online]. AliExpress [retrieved on Jul. 5, 2016]. Retrieved from the Internet: <URL:http://www.allexpress.com/store/product/surveillance-cameras-1-3-Sony-CCD-700TVL-Color-Mini-Security-Camera-Pinhole-Camera-with-Microphone/436808_32422376742.html>.

(Continued)

*Primary Examiner* — Jeremiah C Hallenbeck-Huber
*Assistant Examiner* — Boubacar Abdou Tchoussou
(74) *Attorney, Agent, or Firm* — Haynes and Boone, LLP (57) ABSTRACT

Secure aircraft camera monitoring includes capturing images of an area of interest proximate to an aircraft, and securely transmitting the images as data files over an encrypted communication network associated with the aircraft. In one example, a system includes an image capture device configured to be secured to an aircraft to capture a plurality of images of a field of view of an area of interest proximate to the aircraft. The system also includes a processor configured to receive the plurality of captured images and convert the captured images to a plurality of data files. The system further includes a memory configured to store the data files, and a communication interface configured to connect to an encrypted communication network associated with the aircraft, wherein the communication interface is configured to securely transmit the data files over the encrypted communication network.

16 Claims, 8 Drawing Sheets

(51) Int. Cl.
*H04N 1/00* (2006.01)
*H04N 1/44* (2006.01)
*H04N 1/21* (2006.01)
*H04N 5/225* (2006.01)
*H04N 5/232* (2006.01)

(56) References Cited

U.S. PATENT DOCUMENTS

| | | | | |
|---|---|---|---|---|
| 9,148,585 | B2* | 9/2015 | Cragun | H04N 5/247 |
| 9,497,408 | B2* | 11/2016 | Cragun | H04N 5/247 |
| 9,571,741 | B1* | 2/2017 | Ramsay | H04N 5/144 |
| 9,701,424 | B2* | 7/2017 | Hausmann | B64D 47/02 |
| 2002/0093564 | A1* | 7/2002 | Israel | H04N 7/106 |
| | | | | 348/145 |
| 2003/0152145 | A1* | 8/2003 | Kawakita | H04N 5/77 |
| | | | | 375/240.12 |
| 2004/0008253 | A1* | 1/2004 | Monroe | G08B 13/19641 |
| | | | | 348/143 |
| 2004/0056952 | A1* | 3/2004 | Konya | B64C 25/50 |
| | | | | 348/117 |
| 2005/0193421 | A1* | 9/2005 | Cragun | H04N 5/247 |
| | | | | 725/80 |
| 2010/0309315 | A1* | 12/2010 | Hogasten | H04N 5/33 |
| | | | | 348/164 |
| 2014/0085480 | A1* | 3/2014 | Saptharishi | H04N 7/181 |
| | | | | 348/159 |
| 2014/0241572 | A1* | 8/2014 | Tillotson | B64D 45/0005 |
| | | | | 382/103 |
| 2015/0180965 | A1* | 6/2015 | Wouhaybi | H04L 12/1822 |
| | | | | 709/205 |
| 2015/0206439 | A1* | 7/2015 | Marsden | G08G 5/025 |
| | | | | 701/301 |
| 2016/0014369 | A1* | 1/2016 | Cragun | H04N 5/247 |
| | | | | 386/242 |
| 2016/0150195 | A1* | 5/2016 | Good | H04N 7/188 |
| | | | | 348/143 |
| 2016/0288923 | A1* | 10/2016 | Hausmann | B64D 47/02 |
| 2017/0054920 | A1* | 2/2017 | de Boer | H04N 5/247 |
| 2017/0195556 | A1* | 7/2017 | Emi | G08B 25/00 |
| 2017/0316664 | A1* | 11/2017 | Gerard | B64D 45/0015 |

OTHER PUBLICATIONS

Weatherproof Rearview Backup Camera & Monitor Safety Driving Video System, 10" Monitor, (4) Night Vision Cameras, Commercial Grade, Dual DC Voltage 12-24 for Bus, Truck, Trailer, Van [online]. PYLE [retrieved on Jul. 5, 2016]. Retrieved from the Internet: <URL:http://www.pyleaudio.com/sku/PLCMTR104>.

Raspberry Pi NoIR Infrared Camera Board v2.1 (8MP,1080p) [online]. Pi Supply [retrieved on Jul. 5, 2016]. Retrieved from the Internet: <URL:https://www.pi-supply.com/product/raspberry-pi-noir-infrared-camera-board-v2-1-8mp-1080p>.

Camera Module, Raspberry Pi Camera Module [online]. Raspberry Pi [retrieved on Jul. 5, 2016]. Retrieved from the Internet: <URL:https://www.rs-components.com/raspberripi>.

\* cited by examiner

SECURE AIRCRAFT CAMERA MONITORING SYSTEM

TECHNICAL FIELD

The present invention relates generally to surveillance systems and, more particularly, to image-based aircraft monitoring systems.

BACKGROUND

Camera surveillance systems are used at various facilities and on aircraft to observe activities in areas where security is needed to provide protection and record events. Such camera surveillance systems are typically set up at fixed locations around a building or an area of interest proximate an aircraft. For example, modern aircraft surveillance systems utilize a number of cameras to monitor activities within and around an aircraft.

While existing aircraft surveillance systems provide at least a certain degree of coverage, there are times when cameras are needed in areas lacking surveillance to provide additional monitoring. For example, existing systems may provide only limited coverage for an aircraft parked on a tarmac waiting for repairs or maintenance, or an overnight stopover at a remote airport location. Similarly, existing systems may provide limited flexibility for monitoring specific areas of interest, such as a baggage loading perimeter around an aircraft or a baggage storage compartment within the aircraft. Unfortunately, requirements for added surveillance are dynamic and not easily predictable making it difficult to install cameras in all expected use locations in advance. Furthermore, additional camera installations are both cost and time prohibitive.

Conventional aircraft surveillance systems may rely on conventional ground based surveillance systems to provide coverage. However, existing ground based surveillance may provide only limited coverage for aircraft. For example, coverage at locations outside the airport main terminal may not be adequate. Particularly, remote airport locations may be limited in surveillance capability to provide sufficient coverage for aircraft. Additional external surveillance systems or expansion of existing ground based surveillance systems may not be possible due to cost and time constraints. Thus, there is a need to provide for a flexible on-demand aircraft surveillance system that will meet the needs of modern aircraft security requirements.

SUMMARY

Systems and methods are disclosed herein in accordance with one or more embodiments that provide an improved approach to an aircraft surveillance system. A secure aircraft monitoring camera provides for capturing images of an area of interest proximate to an aircraft, and securely transmitting the images as data files over an encrypted communication network localized to the aircraft. In some embodiments, a camera is implemented with an image capture device and a processor. In one example, the camera is temporarily secured to the aircraft in an orientation to capture images, by the image capture device, of an area of interest. The processor is configured to receive captured images and convert images to data files. The data files are wirelessly transmitted to the local aircraft camera surveillance system over the encrypted communication interface. In another example, the data files are wirelessly transmitted to additional temporary monitoring cameras to provide a redundant storage of the data files. In another example, a camera is fixably secured within an area of interest on the aircraft to covertly monitor activity within the area.

In one embodiment, a system includes an image capture device configured to be secured to an aircraft to capture a plurality of images of a field of view of an area of interest proximate to the aircraft; a processor configured to receive the plurality of captured images and convert the captured images to a plurality of data files; a memory configured to store the data files; and a communication interface configured to connect to an encrypted communication network associated with the aircraft, wherein the communication interface is configured to securely transmit the data files over the encrypted communication network.

In another embodiment, a method includes securing an image capture device to an aircraft; capturing, by the image capture device, a plurality of images of a field of view of an area of interest proximate to the aircraft; converting, by a processor, the captured images to a plurality of data files; storing, by a memory, the data files; and securely transmitting, by a communication interface connected to an encrypted communication network associated with the aircraft, the data files over the encrypted communication network.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Various implementations of an aircraft surveillance system are provided. An aircraft surveillance system includes various cameras used to monitor and record activities within and proximate to an aircraft. A camera captures images of an area of interest, and securely transmits the images as data files over an encrypted communications network localized to the aircraft. In one embodiment, a selectively attachable camera may provide images of an area proximate to the aircraft. For example, a selectively attachable camera may be used to monitor activities such as maintenance operations on the aircraft or monitor areas around the aircraft for recent suspected unlawful activity.

In various embodiments, a camera includes an image capture device, a processor, a memory, and a communication interface. Images are captured by the image capture device and converted to data files by the processor. The memory stores the data files and the communication interface transmits the data files to the aircraft camera system over the local aircraft encrypted communications network. The camera may include a rechargeable battery (e.g., such as a lithium ion battery), providing flexibility to locate the camera where power is not available. Furthermore, the camera communication interface may be a wireless interface providing flexibility to locate the camera in areas where a wired communication interface is not available.

In some embodiments, a camera is implemented as a selectively attachable camera incorporating a magnet (e.g., such as a neodymium magnet) on one side of the camera housing to easily attach to the fuselage of an aircraft. The camera is capable of transmitting H.264 MPEG video and audio, for example, over a secure wireless local aircraft network provided by a local aircraft access point. A mesh network may connect two or more cameras to provide communication between cameras to share video data files and provide greater surveillance of an area. Communicating with other cameras via the mesh network and sharing data files mitigates data loss issues if one camera in the mesh network is damaged or destroyed by accident or intentionally.

In some embodiments, a camera is implemented as a covert camera to provide for monitoring of compartments on the aircraft where security monitoring is warranted. The covert camera incorporated with a microphone, for example, may be mounted behind a panel within the body of the aircraft. An aircraft interface connector provides power and communication signals to the camera. The covert camera transmits image data over the secure wireless local aircraft network provided by the local aircraft access point. Thus, temporary attach and covert cameras provide the capability to adaptably provide surveillance coverage of the aircraft and areas proximate the aircraft as part of the aircraft surveillance system.

Figure 1:
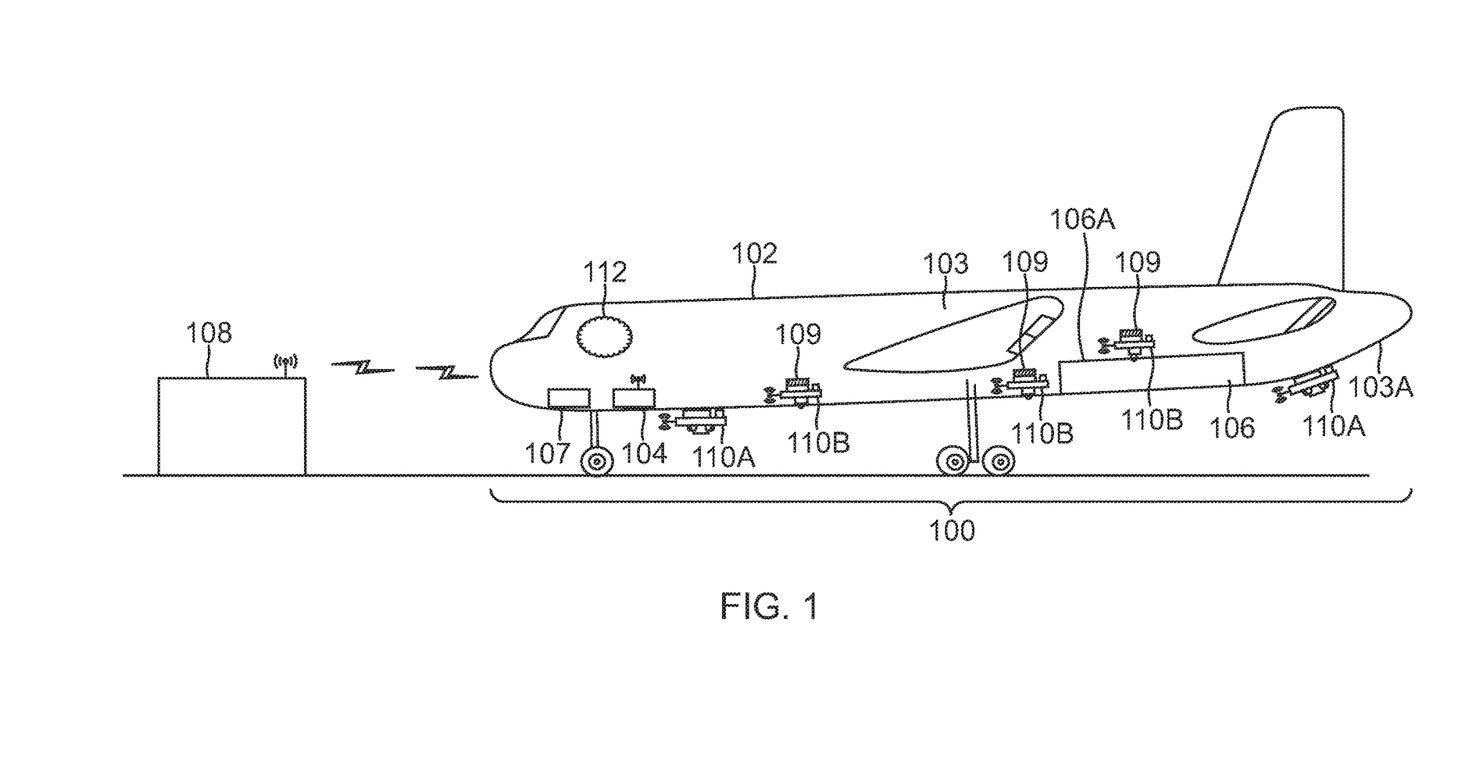
FIG. 1 illustrates an aircraft surveillance system implemented with various cameras secured to an aircraft in accordance with an embodiment of the disclosure.

FIG. 1 illustrates an aircraft surveillance system 100 implemented with various cameras 110 secured to an aircraft 102 in accordance with an embodiment of the disclosure. As shown in FIG. 1, various embodiments of camera 100 are provided, such as a selectively attachable camera 110A and a covert camera 110B, which will are collectively referred to herein as camera 110 where appropriate. Aircraft surveillance system 100 includes various cameras 110 (e.g., cameras 110A and 110B), a local aircraft network 112 provided by a local access point 104, and an on-board aircraft electronics 107. Cameras 110 may be secured to aircraft 102 directly (e.g., to one or more components of aircraft 102) and/or indirectly (e.g., to one or more intermediate structures in contact with aircraft 102) as appropriate. Aircraft surveillance system 100 provides for camera monitoring of locations and activities within and/or proximate to aircraft 102 to support security operations and/or record maintenance/repair operations, for example.

As shown in FIG. 1, multiple embodiments of camera 110 are provided. In this regard, a first embodiment, selectively attachable camera 110A, may be temporarily secured to fuselage 103, for example, to provide temporary monitoring of an area of interest proximate aircraft 102. Selectively attachable camera 110A includes a magnet (e.g., such as magnet 492 of FIG. 4A), a power source (e.g., such as battery 495 of FIG. 4A), and a wireless communication interface (e.g., such as wireless antenna 451 of FIG. 4A) to easily and quickly provide for camera monitoring.

A second embodiment of camera 110, covert camera 110B, may be positioned within aircraft 102 to monitor an area of interest. For example, as shown in FIG. 1, covert camera 110B may be secured to a panel 106A to provide temporary security camera monitoring of a baggage compartment 106. Covert camera 110B may be electrically connected to an aircraft power and communication interface connector 109 to provide aircraft power and communication electrical signals. In this regard, covert camera 110B may be secured to baggage compartment 106 such that a camera lens (e.g., such as optical component 332 of FIG. 3) extends through panel 106A to monitor activities within baggage compartment 106.

Local aircraft network 112 provides for a communication interface between cameras 110 and local aircraft access point 104. In some embodiments, camera 110 wirelessly transmits image data (e.g., such as data files 211 of FIG. 2) over secure encrypted local aircraft network 112 provided by local access point 104, as discussed herein. Camera 110 may transmit image data (e.g., such as data files 211 of FIG. 2) over local aircraft network 112 to on-board electronics 107 for processing, storage, and viewing of data files 211.

On-board electronics 107 may be adapted as a wired interface electrically connected to local access point 104. On-board electronics 107 may communicate over local aircraft network 112 provided by local access point 104. On-board electronics 107 may receive camera image data (e.g., data files 211) from cameras 110. In this regard, on-board electronics 107 may include a processor adapted to process data files 211 and provide data files 211 to a memory for storage. On-board electronics 107 may include a display adapted to display data files 211. Processor may retrieve data files 211 from memory and provide data files 211 to display for viewing by an aircraft crew member.

In some embodiments, ground electronics 108 may be implemented as a central office for airport security operations. Aircraft 102 may be in communication with ground electronics 108 over a secure communication network to transmit data files 211 to ground electronics 108 for processing, storage, and viewing. Similar to on-board electronics 107, ground electronics 108 may include a processor, a memory, and a display. Ground electronics 108 processor may retrieve data files 211 from memory and provide data files 211 to display for viewing by an airport security member.

Figure 2:
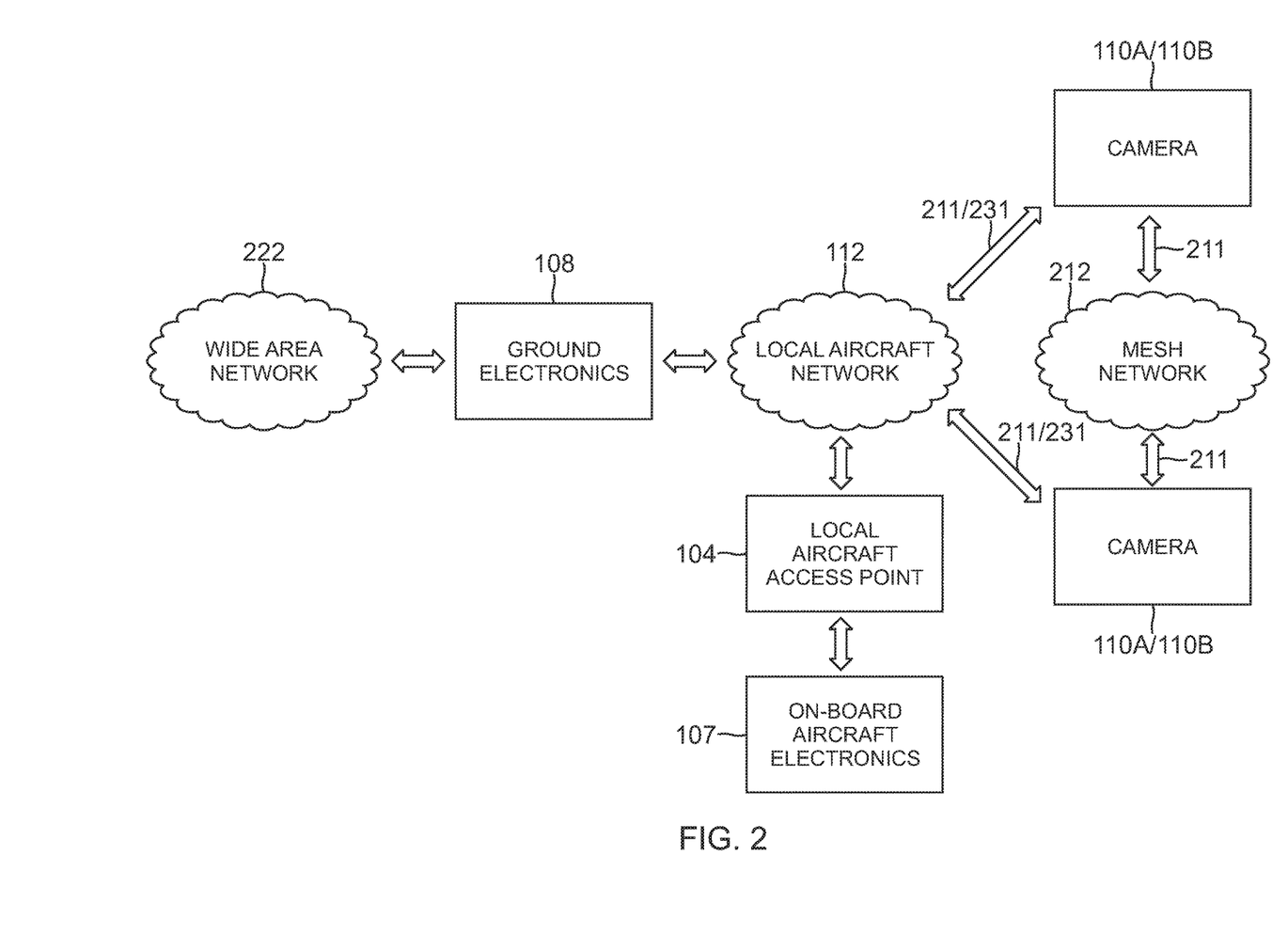
FIG. 2 illustrates various networks and communication interfaces that may be used with various cameras 110 in accordance with an embodiment of the disclosure.

FIG. 2 illustrates various networks and communication interfaces that may be used with various cameras 110 in accordance with an embodiment of the disclosure. Local aircraft network 102 may be implemented as a communication network associated with aircraft 102 (e.g., a network localized to and/or in communication with aircraft 102). FIG. 2 shows local aircraft network 112 provided by local access point 104 in communication with cameras 110. Additionally, local aircraft network 112 is in communication with on-board electronics 107. In some embodiments, on-board electronics 107 is a wired communication interface and communicates over local aircraft network 112 through local aircraft access point 104.

In some embodiments, local aircraft network 112 is an encrypted communications network. In one example, camera 110 wirelessly communicates with on-board electronics 107 over local aircraft network 112 provided by local access point 104 in accordance with security protocol IEEE 802.11i-2004. In other embodiments, camera 110 wirelessly communicates with on-board electronics 107 over local aircraft network 112 provided by local access point 104 in accordance with a transport layer security (TLS) protocol such as TLS1.1 and/or TLS1.2.

Cameras 110 may communicate over a mesh network 212. In some embodiments, each camera 110 wirelessly transmits data files 211 in real time over mesh network to one or more connected cameras 110. In some embodiments, data files 211 are H.264 MPEG format video data files 211. In some embodiments, data files 211 are JPEG image format data files 211. It should be noted that other file formats are possible. In some embodiments, mesh network 212 is an encrypted communications network in accordance with security protocol IEEE 802.11i-2004. Mesh network 212 provides for ad-hoc sharing of data files 211 between connected cameras 110. In this regard, sharing data files 211 between cameras 110 over mesh network 212 provides for redundant storage of data files 211. Communicating with other cameras 110 via mesh network 212 and sharing data files 211 mitigates data loss issues if one or more cameras 110 in mesh network 212 is damaged or destroyed.

In some embodiments, on-board electronics 107 receives data files 211 from cameras 110 over local aircraft network 112 provided by local access point 104. Furthermore, on-board aircraft electronics 107 transmits command and control signals 231 to cameras 110 over local aircraft network 112.

In some embodiments, on-board aircraft electronics 107 is in communication with ground electronics 108 over a secured encrypted wide area network 222 to provide data files 211 to ground electronics 108. In some embodiments, wide area network 222 is adapted as an encrypted communications network in accordance with security protocol IEEE 802.11i-2004.

Figure 3:
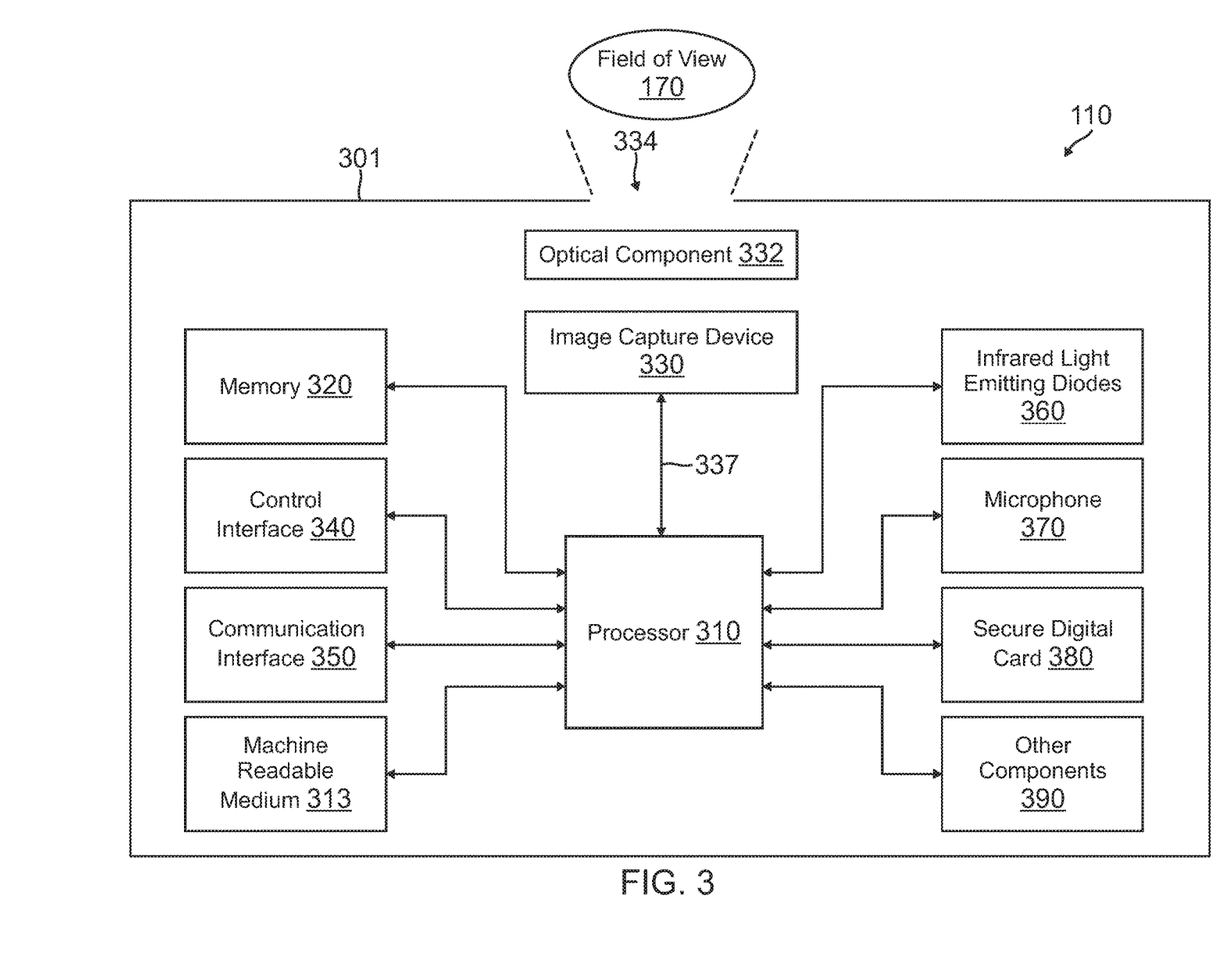
FIG. 3 illustrates a block diagram of a camera in accordance with an embodiment of the disclosure.

FIG. 3 illustrates a block diagram of a camera 110 in accordance with an embodiment of the disclosure. Camera 110 may be used to capture images and transmit data files 211 associated with the images in accordance with various techniques described herein. In one embodiment, various components of camera 110 may be included in a housing 301 to provide a protective enclosure.

In one embodiment, camera 110 includes a processor 310, a memory 320, an image capture device 330, optical component 332 (e.g., one or more lenses configured to receive images through an aperture 334 and pass the images to image capture device 330), a control interface 340, a communication interface 350, one or more infrared light emitting diodes 360, a microphone 370, and a secure digital card 380.

In various embodiments, camera 110 may be implemented to capture image frames, for example, of a scene 170 (e.g., a field of view). Camera 110 may represent any type of camera which, for example, detects visible light and provides representative data (e.g., one or more still data files 211 or video data files 211). In some embodiments, camera 110 may be directed to detect infrared radiation and provide associated image data.

Camera 110 may be implemented, for example, as a selectively attachable camera 110A and/or a covert camera 110B secured to various types of vehicles (e.g., aircraft, land based vehicles, watercraft, or other vehicles). Camera 110A may be secured at various locations (e.g., such as areas of interest within or proximate to an aircraft or other vehicle) via one or more structural mounts, such as a magnet, or other type of temporary mount apparatus. Camera 110B may be secured at various locations out of view of an observer, for example, behind a panel to provide for covert monitoring.

Processor 310 may include, for example, a microprocessor, single-core processor, a multi-core processor, a microcontroller, a field programmable gate array (FPGA), a digital signal processing (DSP) device, one or more memories for storing executable instructions (e.g., software, firmware, or other instructions), and/or any other appropriate combination of processing device and/or memory to execute instructions to perform any of the various operations described herein. Processor 310 is adapted to interface and communicate with components 320, 330, 340, 350, 360, 370, and 380 to perform method and processing steps as described herein.

In various embodiments, it should be appreciated that processing operations and/or instructions may be integrated in software and/or hardware as part of processor 310, or code (e.g., software or configuration data) which may be stored in memory 320. Embodiments of processing operations and/or instructions disclosed herein may be stored by a machine readable medium 313 in a non-transitory manner (e.g., a memory, a hard drive, a compact disk, a digital video disk, or a flash memory) to be executed by a computer (e.g., logic or processor-based system) to perform various methods disclosed herein.

Memory 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processor 310 is adapted to execute software stored in memory 320 and/or machine-readable medium 313 to perform various methods, processes, and operations in a manner as described herein.

Image capture device 330 includes, in one embodiment, one or more sensors (e.g., any type visible light, infrared, or other type of detector) for capturing image signals representative of an image, of scene 170. In one embodiment, the sensors of image capture device 330 provide for representing (e.g., converting) a captured visible image signal of scene 170 as digital data (e.g., via an analog-to-digital converter included as part of the sensor or separate from the sensor as part of camera 110).

Processor 310 may be adapted to receive image signals from image capture device 330, process image signals (e.g., to provide processed data files 211), store image signals or image data (e.g., data files 211) in memory component 320, and/or retrieve stored image signals from memory component 320. Processor 310 may be adapted to process image signals stored in memory 320 to provide image data (e.g., captured and/or processed image data such as data files 211) to communication interface 350 for transmission over local aircraft network 112 and/or mesh network 212.

Control interface 340 may include, in one embodiment, a control panel unit (e.g., a wired or wireless control panel unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of camera 110, such as power on, stand-by, power off, auto-focus, menu enable and selection, field of view (FoV), brightness, contrast, and/or various other features and/or parameters. For one or more embodiments as discussed further herein, control interface 340 may represent appropriate portions of a tablet, a laptop computer, a desktop computer, or other type of device to provide a remote wireless control interface 340 to camera 110. In this regard, remote wireless control interface 340 communicates with camera 110 through a wireless antenna (e.g., such as wireless antenna 451 of FIG. 4A and FIG. 4C).

In one embodiment, communication interface 350 may be implemented as a network interface component (NIC) adapted for communication with a network including other devices in the network. In various embodiments, communication interface 350 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication interface 350 may include an antenna 451 coupled thereto for wireless communication purposes. In other embodiments, the communication interface 350 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In some embodiments, one or more infrared (IR) light emitting diodes 360 may be implemented to provide an illumination of the field of view 170 (e.g., area of interest) of camera 110. IR diodes 360 may compensate for loss of light within the area of interest in low light conditions (e.g., such as camera monitoring operations at night or within internal cavities of aircraft 102). In some embodiments, a microphone 370 is included in camera 110 to provide audio monitoring of the area of interest. A secure digital (SD) card 380, implemented as a flash memory, for example, may be included to provide storage of data files 211. SD card 380 provides a non-volatile memory back up for data files 211. In some embodiments, data files 211 are stored on SD card prior to powering down camera 110 and retrieved when camera 110 is re-powered on. As shown, camera 110 may include other components 390 as appropriate for particular implementations and operation of camera 110, such as other features further discussed herein.

Figure 4A:
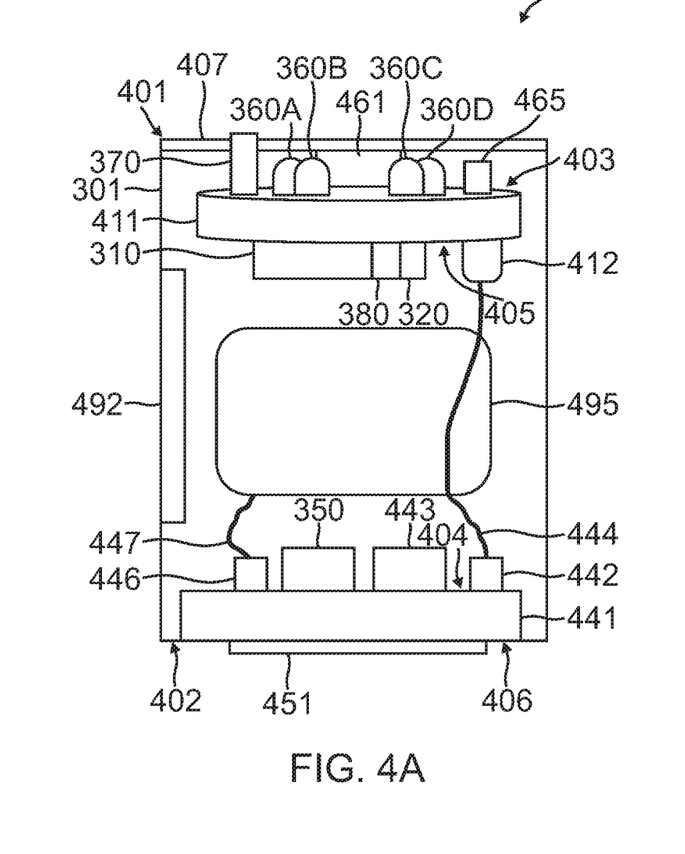
FIGS. 4A and 4B illustrate various elevation views of a selectively attachable camera in accordance with embodiments of the disclosure.
Figure 4B:
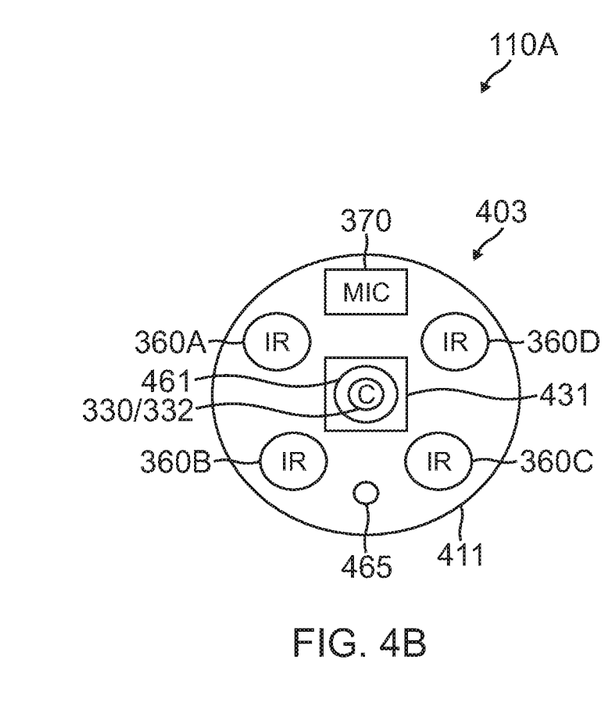

FIGS. 4A and 4B illustrate various elevation views of a selectively attachable camera 110A in accordance with embodiments of the disclosure. Selectively attachable camera 110A may be used to monitor areas of interest where portability and ease of installation are desired. In this regard, selectively attachable camera 110A includes a magnet 492, a power source (e.g., such as battery 495), and wireless communication interface (e.g., such as wireless antenna 451) to easily and quickly provide aircraft surveillance.

In one embodiment, as shown in FIGS. 4A-B, selectively attachable camera 110A includes the components of camera 110 illustrated in FIG. 3. In addition, selectively attachable camera 110A includes a camera interface printed circuit board (PCB) 411 and a power and communication interface PCB 441. Camera interface PCB 411 is physically secured near a top surface 401 of housing 301. A front side 403 of camera interface PCB 411 includes image capture device 330 secured to image capture device mount 431 installed near the center of PCB 411, a plurality of IR diodes 360 (e.g., four diodes 360A, 360B, 360C, and 360D shown in FIGS. 4A-B) mounted to PCB 411 around a perimeter of image capture device 330, a luminance sensor 465, and an IR ring 461 surrounding image capture device 330. IR ring is configured to block IR radiation (e.g., IR radiation from IR diodes 360) from entering optical component 332 of image capture device 330. Housing 301 includes a housing window 407 mounted at top surface 401 of housing 301 to protect front side 403 of camera PCB 411 from environmental debris.

Luminance sensor 465 is adapted to detect a change in luminance within the field of view 170 of image capture device 330. In some embodiments, processor 310 is electrically connected to luminance sensor 465. Processor 310 is configured to turn on image capture device 330 upon receipt of an electrical signal from luminance sensor 465 corresponding to a change in luminance. Additionally, image capture device 330 begins capturing images. In some embodiments, image capture device 330 begins capturing images in response to a change in luminance detected by image capture device 330.

A rear side 405 of camera PCB 411 includes processor 310, SD card 380, memory 320, and a camera PCB connector 412. Connector 412 is electrically coupled to a first end of control interface cable 444. A second end of control interface cable 444 is electrically coupled to power and communication PCB 441 at interface connector 442. Control interface cable 444 provides electrical signals communication between camera PCB 411 and power and communication PCB 441.

Power and communication PCB 441 is physically secured near a bottom surface 402 of housing 301. A front side 404 of power and communication PCB 441 includes communication interface 350 and a power interface 443. Power and communication PCB 441 includes an interface connector 446 adapted to provide power interface 443 electrical signals. Power cable 447 is electrically coupled to battery 495 on a first end and interface connector 446 on a second end. Power cable 447 is adapted to couple power electrical signals between battery 495 and power interface 443. Battery 495 is adapted to provide a power source for camera 110A. Wireless antenna 451 is physically secured to a bottom surface 402 of housing 301. Communication interface 350 is electrically coupled to wireless antenna 451 at power and communication PCB 441 bottom surface 406.

In some embodiments, magnet 492 may be secured to housing 301. Magnet 492 may be adapted to attach selectively attachable camera 110A to a metallic portion of aircraft 102 structure, for example, to provide convenient installation of camera 110 for monitoring activity local to aircraft 102. Magnet 492 may be adapted to deactivate, so as to permit camera 110A to be removed from metallic portion of aircraft 102 structure.

Figure 4C:
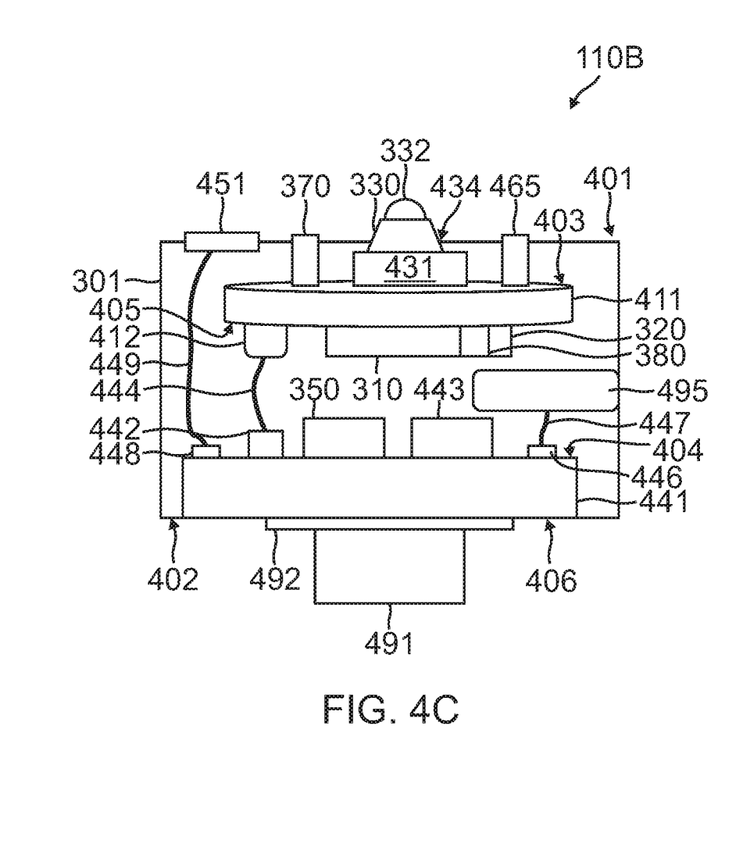
FIGS. 4C and 4D illustrate various elevation views of a covert camera in accordance with embodiments of the disclosure.
Figure 4D:
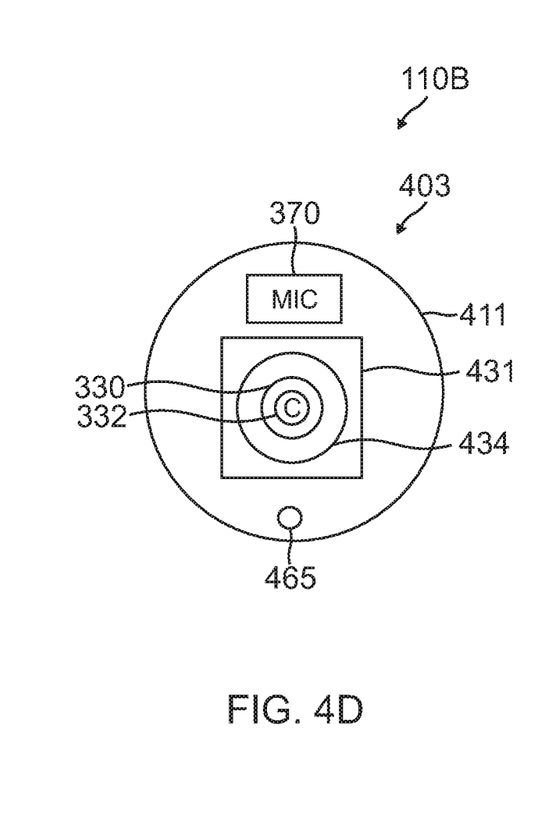

FIGS. 4C and 4D illustrate various elevation views of a covert camera 110B in accordance with embodiments of the disclosure. Convert camera 110B may be used to monitor areas of interest where security and hidden surveillance are important. For example, covert camera 110B may be physically secured to a backside of an aircraft panel within a cabin of aircraft 102 to covertly monitor activities within aircraft 102. In one embodiment, covert camera 110B may be selectively and removably secured to aircraft 102 to monitor activity local to aircraft 102.

In one embodiment, as shown in FIGS. 4C-D, covert camera 110B includes the components of selectively attachable camera 110A illustrated in FIGS. 4A-B and includes the components of camera 110 illustrated in FIG. 3. In addition, covert camera 110B includes a camera interface connector 491. Camera interface connector 491 is mechanically secured to a camera mount 492 at bottom surface 402 of camera 110B. Electrical signals contained within interface connector 491 are electrically coupled to power and communication PCB 441. In some embodiments, covert camera 110B receives power and communications electrical signals from aircraft 102 through aircraft power and communication interface connector 109 coupled to interface connector 491 to provide a wired interface to aircraft 102. In some embodiments, battery 495 is adapted to provide a power source for camera 110 in locations where external power (e.g., such as power signals provided on interface connector 109 as part of aircraft 102) is not available.

As shown in FIG. 4C, wireless antenna 451 is physically secured to top surface 401 of housing 301. An antenna cable 449 is connected to wireless antenna 451 at a first end and connected to an antenna interface connector 448 (e.g., connector 448 is mechanically and electrically coupled to power and communication PCB 441) at a second end. Antenna cable 449 couples electrical communication signals between wireless antenna 451 and power and communication PCB 441.

In some embodiments, optical component 332 may include a fisheye lens, a wide angle lens, and/or a narrow angle lens depending on the choice of field of view 170 and the area of interest. For example, a fisheye lens may permit a 360 degree view of the area of interest appropriate for monitoring activity in a compartment of aircraft 102. A wide angle lens may be appropriate for monitoring a more expansive area such as an area proximate to aircraft 102. Additionally, a narrow angle may be appropriate for monitoring a maintenance operation on fuselage 103 or within a compartment of aircraft 102. In some embodiments, covert camera 110B may include an aperture 434 which allows for optical component 332 to partially extend beyond top surface 401 of housing 301 to provide for mounting camera 110B behind a panel or structure hidden from view.

Figure 5:
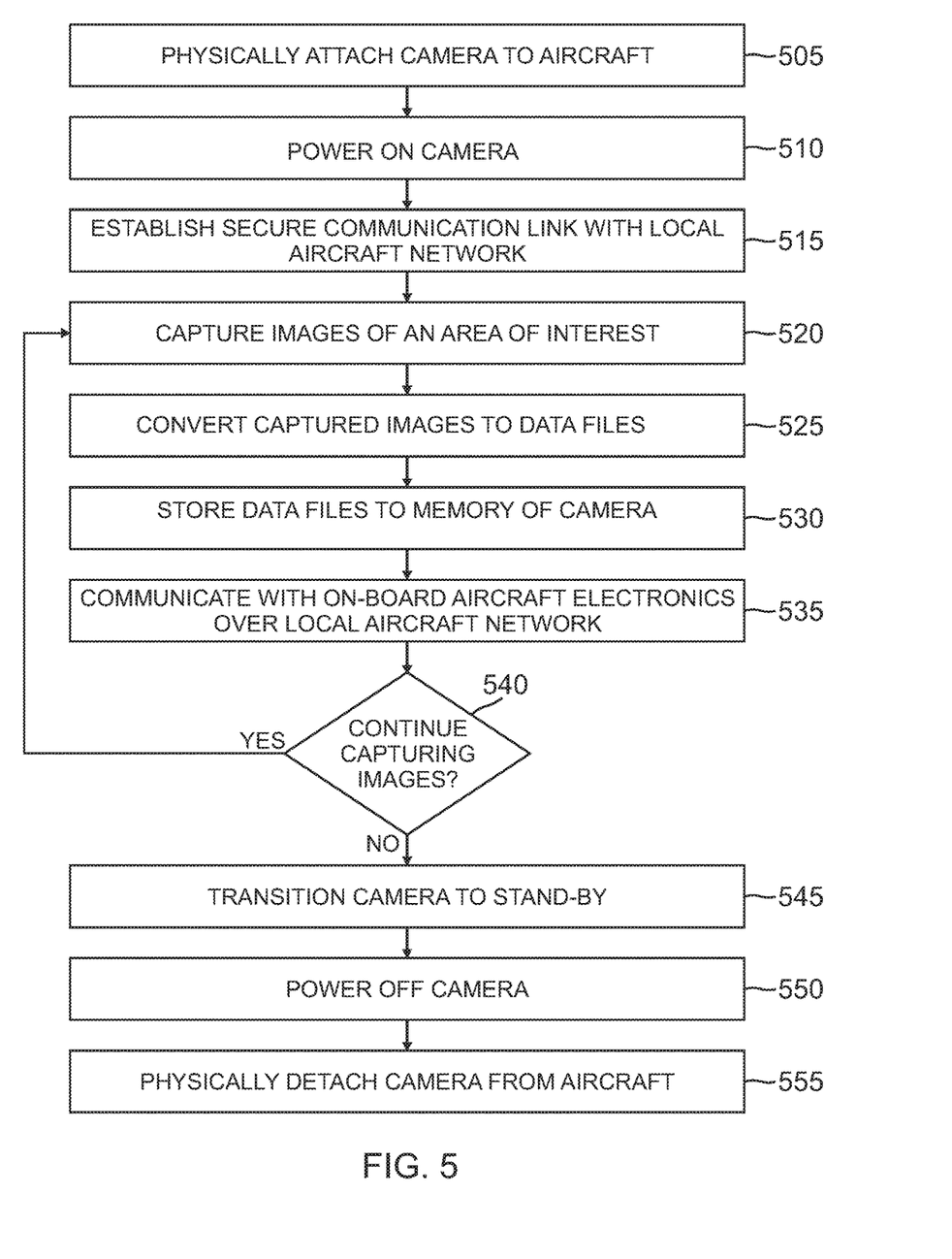
FIG. 5 illustrates a process of using a camera in accordance with an embodiment of the disclosure.

FIG. 5 illustrates a process of using a camera 110 in accordance with an embodiment of the disclosure.

In block 505, camera 110 is physically attached to aircraft 102. In some embodiments, selectively attachable camera 110A is secured to a metallic portion of fuselage 103, for example, by magnet 492 to provide a field of view 170 of a perimeter of a cargo area proximate aircraft 102, for example. In some embodiments, covert camera 110B is secured behind a panel 106A, for example, and optical component 332 may extend through panel 106A to provide a view of baggage compartment 106. Camera 110B may be secured to panel 106A by mechanical fasteners. In some embodiments, covert camera 110B is electrically coupled to aircraft power and communication interface connector 109 at camera interface connector 491 to provide aircraft power and communication electrical signals to camera 110B.

In block 510, camera 110 (e.g., such as camera 110A and camera 110B of block 505) is powered on. In some embodiments, power-on signals is communicated from control interface 340 to power interface 443 by manual operation. In some embodiments, power-on signals is communicated by remote wireless control interface 340 adapted to communicate with camera 110 through wireless antenna 451. In some embodiments, camera 110B receives power from aircraft 102 through aircraft power and communication interface connector 109, as described herein. In some embodiments, cameras 110A and 110B include a battery 495 to provide power.

In block 515, camera 110 establishes a secure communication link with local aircraft network 112 through local aircraft access point 104 in accordance with aircraft 102 security protocol, IEEE 802.11i-2004 for example.

In block 520, camera 110 begins capturing images, by image capture device 330, of the area of interest described in block 505. In some embodiments, image capture device 330 begins capturing images in response to a detected change in luminance as further described in process steps of FIG. 7.

In block 525, processor 310 receives and converts captured images into data files 211. In some embodiments, captured images are converted to H.264 MPEG format video data files 211.

In block 530, data files 211 are stored in memory 320 of camera 110. In some embodiments, data files 211 are redundantly stored in SD card 380.

In block 535, camera 110 securely transmits data files 211 via communication interface 350 of camera 110 over local aircraft network 112 to on-board aircraft electronics 107. In some embodiments, data files 211 are securely transmitted wirelessly via wireless antenna 451 of camera 110 over local aircraft network 112 to on-board electronics 107. In other embodiments, data files 211 are securely transmitted through camera interface connector 491 of camera 110 via an aircraft 102 wired communication connection to on-board electronics 107. In some embodiments, two or more cameras 110 wirelessly share data files 211 over mesh network 212 as further described in process steps of FIG. 6.

In some embodiments, on-board electronics 107 may include a processor, a memory, and a display. Processor may be adapted to process data files 211 and provide data files 211 to memory for storage. Processor may retrieve data files 211 from memory and provide data files 211 to display for viewing by an aircraft crew member.

In block 540, additional image captures may be needed to record additional activity within the area of interest or further monitoring is required of an aircraft 102 cargo area, for example. In this regard, the process of FIG. 5 may return to block 520 to continue capturing images, by image capture device 330, of the area of interest and processing, by processor 310, the captured images. If no additional image captures are required, the process of FIG. 5 moves to block 545.

In block 545, camera 110 is placed in stand-by mode by operation of control interface 340. In some embodiments, stand-by signals are communicated from control interface 340 to power interface 443 by manual operation. In some embodiments, stand-by signals are communicated by remote wireless control interface 340 adapted to communicate with camera 110 through wireless antenna 451.

In block 550, camera 110 is powered off by operation of control interface 340. Power-off signals are communicated from control interface 340 to power interface 443 in a manner similar to processes of block 510.

In block 555, selectively attachable camera 110A may be detached from fuselage 103, for example, by deactivating magnet 492 and removing selectively attachable camera 110A from metallic portion of fuselage 103. Covert camera 110B may be detached from panel 106A of baggage compartment 106 by disconnecting aircraft power and communication interface connector 109 from camera interface connector 491 and removing mechanical fasteners from camera 110B.

Removable cameras 110A and 110B provide advantages to aircraft operations in various embodiments. For example, by using removable cameras 110A and/or 110B, the overall weight of aircraft 102 may be reduced during flight while still permitting secure camera surveillance on the ground, as a desired number of cameras 110A and/or 110B may be easily and conveniently removed prior to flight. Furthermore, because cameras 110A may be removed from the exterior of aircraft 102 prior to flight, secure camera surveillance can be maintained on the ground without altering the in-flight aerodynamic properties of aircraft 102.

Figure 6:
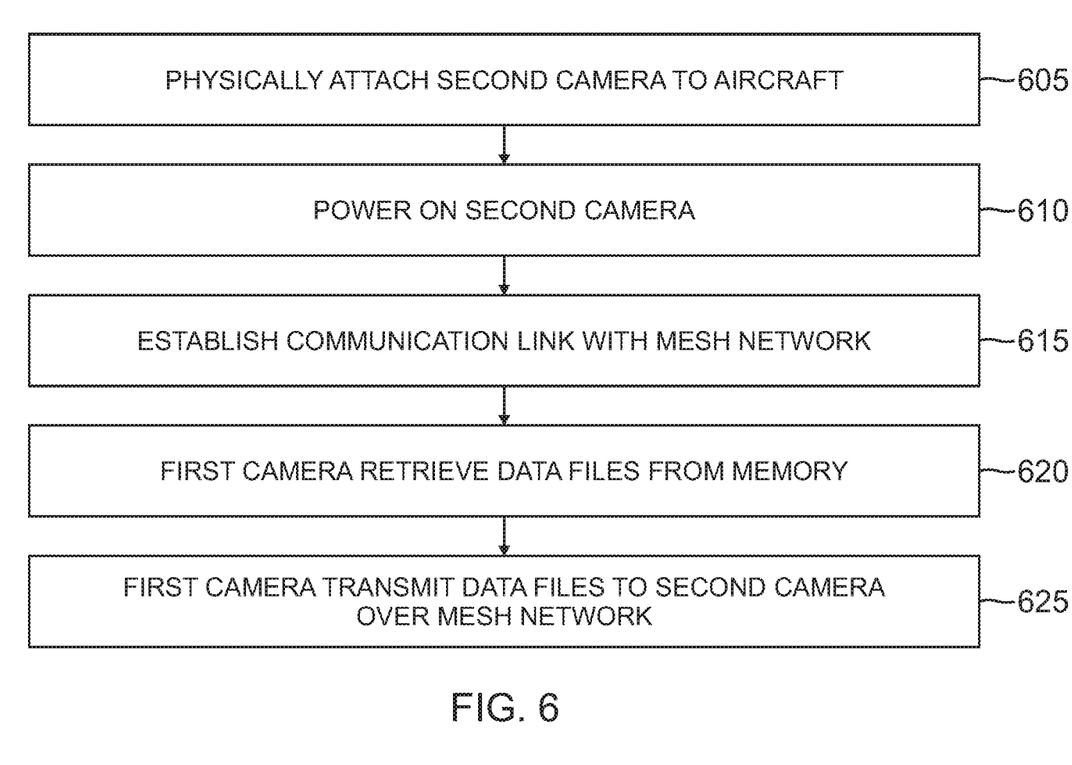
FIG. 6 illustrates a process of transmitting data files between cameras in accordance with an embodiment of the disclosure.

FIG. 6 illustrates a process of transmitting data files 211 between cameras 110 in accordance with an embodiment of the disclosure. In this regard, a first camera 110 wirelessly transmits data files 211 in real time over mesh network 212 to a second camera 110 connected to mesh network 212. Transmitting data files 211 between cameras 110 over mesh network 212 provides for redundant (e.g., back up) storage of data files 211 in the event a camera 110 is disabled or destroyed.

In block 605, a second camera 110 (e.g., second camera 110A and/or second camera 110B) is physically attached to aircraft 102 in a manner similar to block 505 of FIG. 5. In some embodiments, second selectively attachable camera 110A may be secured to a metallic portion of fuselage 103, for example, by magnet 492 to provide a field of view 170 of a perimeter of a tail section 103A proximate aircraft 102. Alternatively, in other embodiments, second covert camera 110B may be secured behind a panel with cabin area of aircraft 102, for example, and optical component 332 may extend through a panel of cabin area to provide a view of the cabin area.

In block 610, second camera 110 is powered on in a manner similar to block 510 of FIG. 5.

In block 615, second camera 110 establishes a secure communication link with local aircraft network 112 through local aircraft access point 104 in accordance with aircraft 102 security protocol, IEEE 802.11i-2004 for example.

In block 620, a first camera 110 may capture images, convert, by processor 310, captured images into data files 211, and store data files 211 in memory 320. Additionally, first camera retrieves data files 211 from memory 320.

In block 625, first camera 110 wirelessly transmits data files 211 retrieved in block 620 over mesh network 212 to second camera 110. Second camera 110 receives data files 211 and stores data files 211 in second camera memory 320. In this regard, mesh network 212 provides for ad-hoc sharing of data files 211 between connected cameras 110.

Figure 7:
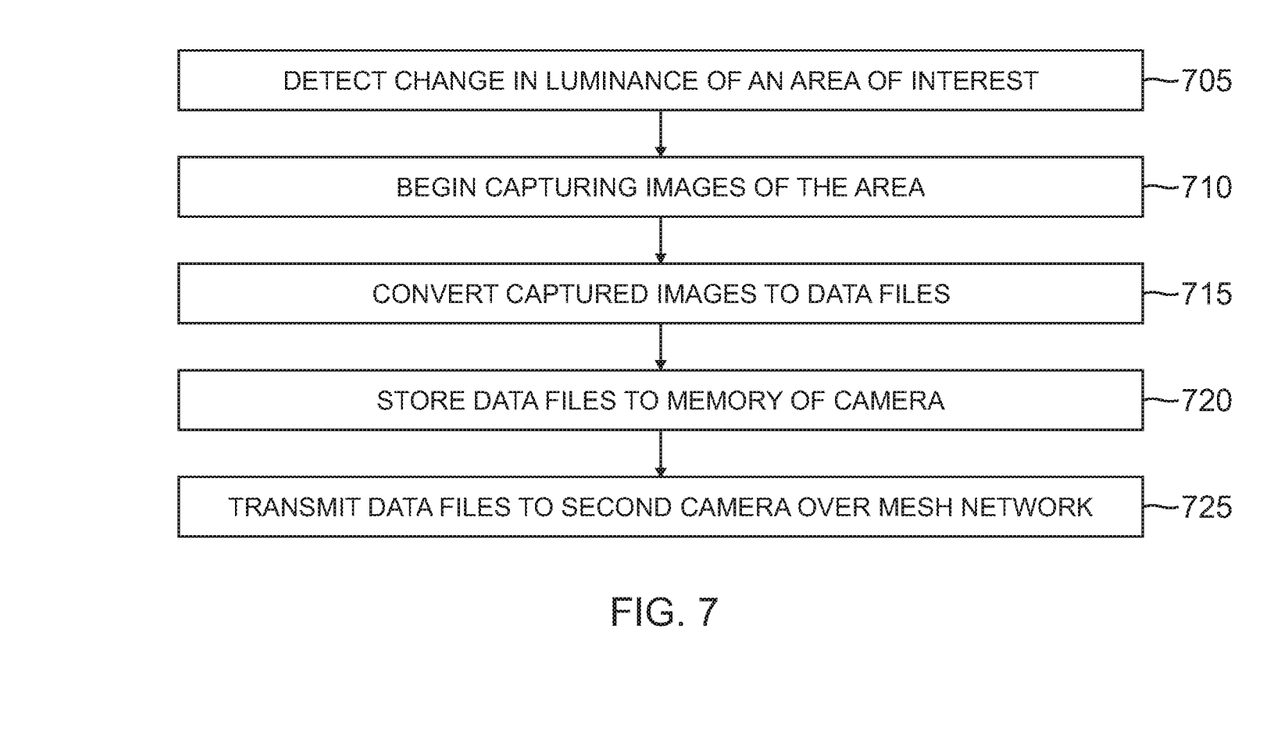
FIG. 7 illustrates a process of operating a camera after a detected change in luminance in accordance with an embodiment of the disclosure.

FIG. 7 illustrates a process of operating a camera 110 after a detected change in luminance in accordance with an embodiment of the disclosure.

In block 705, in some embodiments, camera 110 includes a luminance sensor 465 connected to a top surface 403 of a camera interface printed circuit board (PCB) 411 to detect a change in luminance within a field of view 170 of camera 110. In this regard, as a change in luminance is detected by sensor 465, sensor 465 provides an electrical signal to processor 310 to alert processor 310 of the detected change. In other embodiments, image capture device 330 detects a change in luminance within the field of view 170.

In block 710, in some embodiments, processor 310 receives detected change in luminance electrical signal from sensor 465. In response, processor 310 turns on image capture device 330 to begin capturing images of the area of interest within the field of view 170. In other embodiments, image capture device 330 begins capturing images of the area of interest within the field of view 170 after image capture device 330 has detected a change in luminance.

In block 715, processor 310 receives image data from image capture device 330 and converts image data to H.264 MPEG format video data files 211.

In block 720, processor 310 provides data files 211 to memory 320 for storage. In some embodiments processor 310 provides data files 211 to SD card 380 for storage.

In block 725, camera 110 wirelessly transmits data files 211 over mesh network 212 to a second camera 110. Second camera 110 receives data files 211 and stores data files 211 in second camera memory 320. In this regard, data files 211 are stored in a redundant camera 100 in the event camera 110 (e.g., first camera 110 that initially captured, processed and stored data files 211) is disabled or destroyed.

In view of the present disclosure, it will be appreciated that providing a camera in accordance with various embodiments set forth herein may provide for enhanced camera surveillance of an aircraft. In this regard, by providing temporary attach and covert cameras, capturing images of a plurality of areas of interest proximate to an aircraft, real-time processing images and wirelessly transmitting processed images over a secured local aircraft network, transferring processed images to on-board aircraft electronics for further processing and viewing by crew members, and sharing data files between cameras over a mesh network for redundant storage, an adaptable, secure and reliable surveillance system may be implemented for aircraft.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   an image capture device configured to capture a plurality of images of a field of view of an area of interest;
   a processor configured to receive the plurality of captured images and convert the captured images to a plurality of data files;
   a memory configured to store the data files;
   a wireless communication interface configured to connect to an encrypted wireless communication network associated with an aircraft, wherein the wireless communication interface is configured to securely transmit the data files over the encrypted wireless communication network;

a housing implemented with the image capture device, the processor, the memory, and the wireless communication interface to provide a camera configured to be selectively and removably attached to the aircraft to monitor activity in the area of interest;

wherein the camera is a first camera, the system further comprises a second camera configured to be selectively and removably attached to the aircraft after the first camera is attached, to monitor activity in a second area of interest, connect to the encrypted wireless communication network, and communicate over the encrypted wireless communication network;

wherein the first camera and the second camera are configured to establish a communication link with each other over an encrypted wireless mesh network separate from the encrypted wireless communication network associated with the aircraft to provide for ad-hoc sharing of the data files between the first and second cameras over the encrypted wireless mesh network; and wherein the first camera is configured to transfer the plurality of data files to the second camera by the wireless communication interface over the encrypted wireless mesh network to provide for redundant storage of the data files in response to a change in luminance within the field of view of the area of interest detected by the system.

2. The system of claim 1, wherein the first camera is configured to be fixably installed within a portion of the aircraft to covertly monitor the activity in the area of interest.

3. The system of claim 1, wherein the first camera and the second camera are each configured to wirelessly communicate the data files to on-board aircraft electronics through the encrypted wireless communication network.

4. The system of claim 1, wherein the change in luminance is detected by the image capture device.

5. The system of claim 1, further comprising a luminance sensor in communication with the processor, wherein the change in luminance is detected by the sensor.

6. The system of claim 1, further comprising an infrared light emitting diode (LED) configured to illuminate the area of interest.

7. The system of claim 1, wherein the processor is implemented as a field programmable gate array (FPGA) selectively configurable to change operations performed by the processor.

8. An aircraft comprising the system of claim 1.

9. A method comprising:

providing a first camera configured to be selectively and removably attached to an aircraft, the first camera comprising a housing, an image capture device, a processor, a memory, and a wireless communication interface;

securing the first camera to the aircraft to monitor activity in an area of interest;

capturing, by the image capture device, a plurality of images of a field of view of the area of interest;

converting, by the processor, the captured images to a plurality of data files;

storing, by the memory, the data files;

securely transmitting, by the wireless communication interface connected to an encrypted wireless communication network associated with the aircraft, the data files over the encrypted wireless communication network;

storing the data files to a memory of the first camera;

securing a second camera to the aircraft after the first camera is secured to the aircraft, to monitor activity in a second area of interest, connect to the encrypted wireless communication network, and communicate over the encrypted wireless communication network;

establishing a communication link between the first and second cameras over an encrypted wireless mesh network separate from the encrypted wireless communication network associated with the aircraft to provide for ad-hoc sharing of the data files between the first and second cameras; and transferring the data files from the first camera to the second camera over the encrypted wireless mesh network to provide for redundant storage of the data files in response to detecting a change in luminance within the field of view of the area of interest.

10. The method of claim 9, wherein the securing comprises fixably installing the first camera within a portion of the aircraft to covertly monitor activity in the area of interest.

11. The method of claim 9, wherein the first camera and the second camera are each configured to communicate the data files to on-board aircraft electronics through the encrypted wireless communication network.

12. The method of claim 9, wherein the change in luminance is detected by the image capture device.

13. The method of claim 9, wherein the change in luminance is detected by a luminance sensor.

14. The method of claim 9, further comprising illuminating, by an infrared light emitting diode (LED), the area of interest.

15. The system of claim 1, further comprising a magnet configured to selectively and removably attach the first camera and/or the second camera to the aircraft.

16. The method of claim 9, further comprising selectively and removably attaching the first camera and/or the second camera to the aircraft by a magnet.

* * * * *